US008154987B2

(12) United States Patent
Yavatkar et al.

(10) Patent No.: US 8,154,987 B2
(45) Date of Patent: Apr. 10, 2012

(54) SELF-ISOLATING AND SELF-HEALING NETWORKED DEVICES

(75) Inventors: Raj Yavatkar, Portland, OR (US); Alan Crouch, Lake Oswego, OR (US); David M. Durham, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1149 days.

(21) Appl. No.: 10/865,365

(22) Filed: Jun. 9, 2004

(65) Prior Publication Data

US 2005/0276228 A1 Dec. 15, 2005

(51) Int. Cl.
*G01R 31/08* (2006.01)
*G06F 15/173* (2006.01)

(52) U.S. Cl. .......... 370/216; 370/242; 709/224

(58) Field of Classification Search .......... 713/187; 714/36; 709/224; 726/21–27
See application file for complete search history.

(56) References Cited

U.S. PATENT DOCUMENTS

| | | | |
|---|---|---|---|
| 5,333,130 A * | 7/1994 | Weissmann et al. .......... 370/221 |
| 5,421,006 A * | 5/1995 | Jablon et al. .......... 714/36 |
| 5,475,625 A * | 12/1995 | Glaschick .......... 709/224 |
| 5,475,839 A | 12/1995 | Watson et al. |
| 5,539,659 A * | 7/1996 | McKee et al. .......... 709/224 |
| 5,706,210 A * | 1/1998 | Kumano et al. .......... 709/224 |
| 5,748,888 A | 5/1998 | Angelo et al. |
| 5,884,033 A | 3/1999 | Duvall et al. |
| 5,918,008 A | 6/1999 | Togawa et al. |
| 5,991,881 A * | 11/1999 | Conklin et al. .......... 726/22 |
| 6,141,757 A | 10/2000 | Seeker et al. |
| 6,263,388 B1 * | 7/2001 | Cromer et al. .......... 710/107 |
| 6,301,668 B1 | 10/2001 | Gleichauf et al. |
| 6,321,338 B1 | 11/2001 | Porras |
| 6,453,345 B2 | 9/2002 | Trcka |
| 6,484,203 B1 * | 11/2002 | Porras et al. .......... 709/224 |
| 6,598,081 B1 | 7/2003 | Coile et al. |
| 6,647,400 B1 * | 11/2003 | Moran .......... 707/205 |
| 6,681,232 B1 * | 1/2004 | Sistanizadeh et al. ...... 707/104.1 |
| 6,725,378 B1 | 4/2004 | Schuba et al. |
| 6,772,334 B1 | 8/2004 | Glawitsch |
| 6,779,033 B1 | 8/2004 | Watson et al. |
| 6,789,203 B1 | 9/2004 | Belissent |
| 6,944,663 B2 | 9/2005 | Schuba et al. |
| 6,954,790 B2 | 10/2005 | Forslow |
| 6,971,028 B1 | 11/2005 | Lyle et al. |
| 7,058,718 B2 | 6/2006 | Fontes et al. |
| 7,058,970 B2 * | 6/2006 | Shaw .......... 726/6 |
| 7,194,767 B1 | 3/2007 | Boydstun et al. |
| 7,225,467 B2 | 5/2007 | Dapp |
| 7,231,455 B2 | 6/2007 | Marejka et al. |
| 7,249,187 B2 | 7/2007 | Sobel et al. |

(Continued)

OTHER PUBLICATIONS

Office Action U.S. Appl. No. 10/196,541 mailed on Jul. 20, 2006.

(Continued)

*Primary Examiner* — Kevin Bates
*Assistant Examiner* — Robert B McAdams
(74) *Attorney, Agent, or Firm* — Blakely, Sokoloff, Taylor & Zafman LLP (57) ABSTRACT

Techniques for self-isolation of a network device that has been identified as potentially harmful. The network device may be isolated from the network except for an out-of-band communication channel that can be used for management purposes to restore or repair the device prior to the network connection being re-established.

58 Claims, 6 Drawing Sheets

U.S. PATENT DOCUMENTS

| | | | |
|---|---|---|---|
| 7,296,070 B2 * | 11/2007 | Sweeney et al. | 709/224 |
| 7,362,865 B2 | 4/2008 | Karp | |
| 7,398,394 B1 | 7/2008 | Johnsen et al. | |
| 7,441,272 B2 | 10/2008 | Durham et al. | |
| 7,490,149 B2 * | 2/2009 | Omote et al. | 709/224 |
| 7,523,494 B2 * | 4/2009 | Himberger et al. | 726/13 |
| 7,591,017 B2 * | 9/2009 | Watkins et al. | 726/24 |
| 2002/0032871 A1 | 3/2002 | Malan et al. | |
| 2003/0172145 A1 | 9/2003 | Nguyen | |
| 2003/0233450 A1 * | 12/2003 | Carley | 709/224 |
| 2004/0008681 A1 | 1/2004 | Govindarajan et al. | |
| 2004/0083385 A1 | 4/2004 | Ahmed et al. | |
| 2004/0103310 A1 | 5/2004 | Sobel et al. | |
| 2004/0168085 A1 | 8/2004 | Omote et al. | |
| 2005/0149747 A1 | 7/2005 | Wesinger et al. | |
| 2005/0276228 A1 | 12/2005 | Yavatkar et al. | |
| 2006/0005245 A1 | 1/2006 | Durham et al. | |
| 2006/0095961 A1 | 5/2006 | Govindarajan et al. | |
| 2006/0095970 A1 | 5/2006 | Rajagopal et al. | |
| 2006/0101409 A1 | 5/2006 | Bemmel | |
| 2006/0206943 A1 | 9/2006 | Ellison et al. | |
| 2006/0272025 A1 | 11/2006 | Mononen | |
| 2007/0143857 A1 | 6/2007 | Ansari | |
| 2007/0283444 A1 | 12/2007 | Jang | |

OTHER PUBLICATIONS

Schuba, et al., "Analysis of a Denial of Service Attack on TCP," IEEE, pp. 208-223, 1997.

Osman, et al., "A Stateful Inspection Module Architecture," IEEE, pp. 259-265, 2000.

Matthew M. Williamson, "Throttling Viruses: Restricting Propagation to Defeat Mailicious Mobile Code", Information Infrastructure Laboratory, HP Laboratories Bristol, HPL-2002-172, Jun. 17, 2002, pp. 1-7, Hewlett-Packard Company.

Matthew M. Williamson, "Throttling Viruses: Restricting Propagation to Defeat Mailicious Mobile Code", Information Infrastructure Laboratory, HP Laboratories Bristol, HPL-2002-172 (R.1), Dec. 10, 2002, ACSAC Conference-Las Vegas, NV, pp. 1-9, Hewlett-Packard Company.

J. Twycross & M.M. Williamson, "Implementing and Testing a Virus Throttle", Trusted Systems Laboratory, HP Laboratories Bristol, HPL-2003-103, May 21, 2003, pp. 1-11, Proceedings 12th USENIX Security Symposium—Aug. 4-8, 2003 in Washington, D.C., Hewlett-Packard Company.

Matthew M. Williamson, "Design, Implementation and Test of an Email Virus Throttle", Information Infrastructure Laboratory, HP Laboratories Bristol, HPL-2003-118, Jun. 30, 2003, pp. 1-10, Hewlett-Packard Company.

M.M. Williamson et al., "Virus Throttling", Virus Bulletin, Mar. 2003, pp. 8-11, Virus Bulletin Ltd, The Pentagon, Abingdon, Oxfordshire, OX14 3YP, England.

M.M. Williamson et al., "Virus Throttling for Instant Messaging", Digital Media Systems Laboratory, HP Laboratories Bristol, HPL-2004-81, May 5, 2004, pp. 1-10, Virus Bulletin Conference of Sep. 2004 in Chicago, IL, Hewlett-Packard Company.

Office Action for U.S. Appl. No. 10/331,857 mailed Feb. 5, 2008, Whole Document.

Bernstein, et al., e-mail message Re: SYN Flooding [info], p. 1, 2001.

Bernstein, et al., "SYN cookies", pp. 1-3, 2001.

Levchenko, Kirill et al., "On the Difficulty of Scalably Detecting Network Attacks", CCS '04, Oct. 25-29, 2004, Washington DC, USA. , 9 pgs.

Non-final Office Action for U.S. Appl. No. 10/976,397 mailed Sep. 17, 2008.

Final Office Action for U.S. Appl. No. 10/331,857 dated Nov. 2, 2006.

Non-Final Office Action for U.S. Appl. No. 10/331,857 dated Apr. 27, 2007.

Final Office Action for U.S. Appl. No. 10/331,857 dated Sep. 26, 2007.

Final Office Action for U.S. Appl. No. 10/331,857 dated Apr. 22, 2009.

Non-Final Office Action for U.S. Appl. No. 10/331,857 dated Feb. 5, 2008.

Non-Final Office Action for U.S. Appl. No. 10/865,355 dated Nov. 30, 2007.

Menezes, Alfred et al., "Handbook of Applied Cryptography", CRC Press, 1997, pp. 543-590.

USPTO, et al., "Final Office Action for U.S. Appl. No. 10/976,397 mailed Sep. 15, 2009.", Sep. 15, 2009 , Whole Document.

Office Action for U.S. Appl. No. 10/976,397 mailed Dec. 23, 2009, Whole Document.

Final Office Action for U.S. Appl. No. 10/976,397, mailed Jun. 11, 2010, Whole Document.

* cited by examiner

SELF-ISOLATING AND SELF-HEALING NETWORKED DEVICES

RELATED APPLICATIONS

This U.S. patent application is related to U.S. patent application entitled "TECHNIQUES FOR SELF-ISOLATION OF NETWORKED DEVICES" filed concurrently herewith.

TECHNICAL FIELD

Embodiments of the invention relate to network security functionality. More particularly, embodiments of the invention relate to techniques for allowing network devices to be self-isolating and/or self-healing.

BACKGROUND

Many current networked devices use traditional software mechanisms to detect intrusions such as viruses, worms and denial of service attacks based on known signatures or patterns. The software mechanisms monitor system behavior and/or incoming traffic and apply appropriately configured filters/signatures to the incoming traffic in order to determine whether or not a system has been infected or is being attacked. However, such an approach is reactive and requires prior knowledge of intrusions or attacks so that appropriate traffic or platform behavior filters can be used by the software mechanisms. Software based firewalls and intrusion detection techniques are susceptible to tampering and can even be circumvented or disabled.

Once infected by a worm/virus, the worm/virus can rapidly spread to other systems before a central management station can provide an updated signature or pattern for the new attack. Moreover, some of the worms/viruses consume significant network bandwidth thereby making it impossible for the remote administrators to reach the infected system and isolate it from the rest of the network. Thus, the entire network or a significant part of it can be infected before appropriate security measures can be taken. Traditional software-based mechanisms for protecting against viruses, worms and denial of service attacks are hence not optimal.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Overview

Described in greater detail below is a technique for isolation of a network device (e.g., a computer system) that has been identified as potentially harmful. Conceptually, the process of identifying a potentially harmful networked device and isolating the device may be referred to as a "network circuit breaker" that isolates the potentially harmful network device from the network. In one embodiment, the network device may be isolated from the network except for an out-of-band communication channel that may be used for management purposes to restore or repair the device prior to the network connection being re-established.

In the description that follows, the term "isolation" refers to total isolation from the network, isolation from the network during which the host system maintains an out-of-band (OOB) communications channel, as well as throttling of the network connection. Isolation with the OOB channel allows for remote administration/management during the isolation period. Throttling of the network connection may slow the spread of unusual traffic until diagnostic action is taken. Other actions that may be taken in response to tripping of the network circuit breaker may further include switching network traffic on a virtual LAN (VLAN) allocated to be a remediation network, or alerting remote administrators that a problem was discovered.

Multiple mechanisms can be used to support self-isolating functionality. In one embodiment, an embedded agent within a system executes management functions that disable communications except for an out-of-band management communications channel that can be used for repair and/or restoration purposes. In one embodiment, the embedded agent operates independently of the operating system so that the self-isolation functionality is available whether or not the operating system is loaded and whether or not the operating system is functional or compromised.

In general, an embedded agent within a network device may operate to disable or remove one or more communications devices or other system components in response to a determination that the network device is potentially harmful. In one embodiment, the embedded agent may use configuration bits written to a configuration register for one or more communications interfaces to cause the network device to determine that the communications interfaces are no longer functioning. The embedded agent may also filter traffic to or from specific applications, protocol types, or remote addresses and can be configured to take actions against a specified subset of traffic.

System Overview

Figure 1:
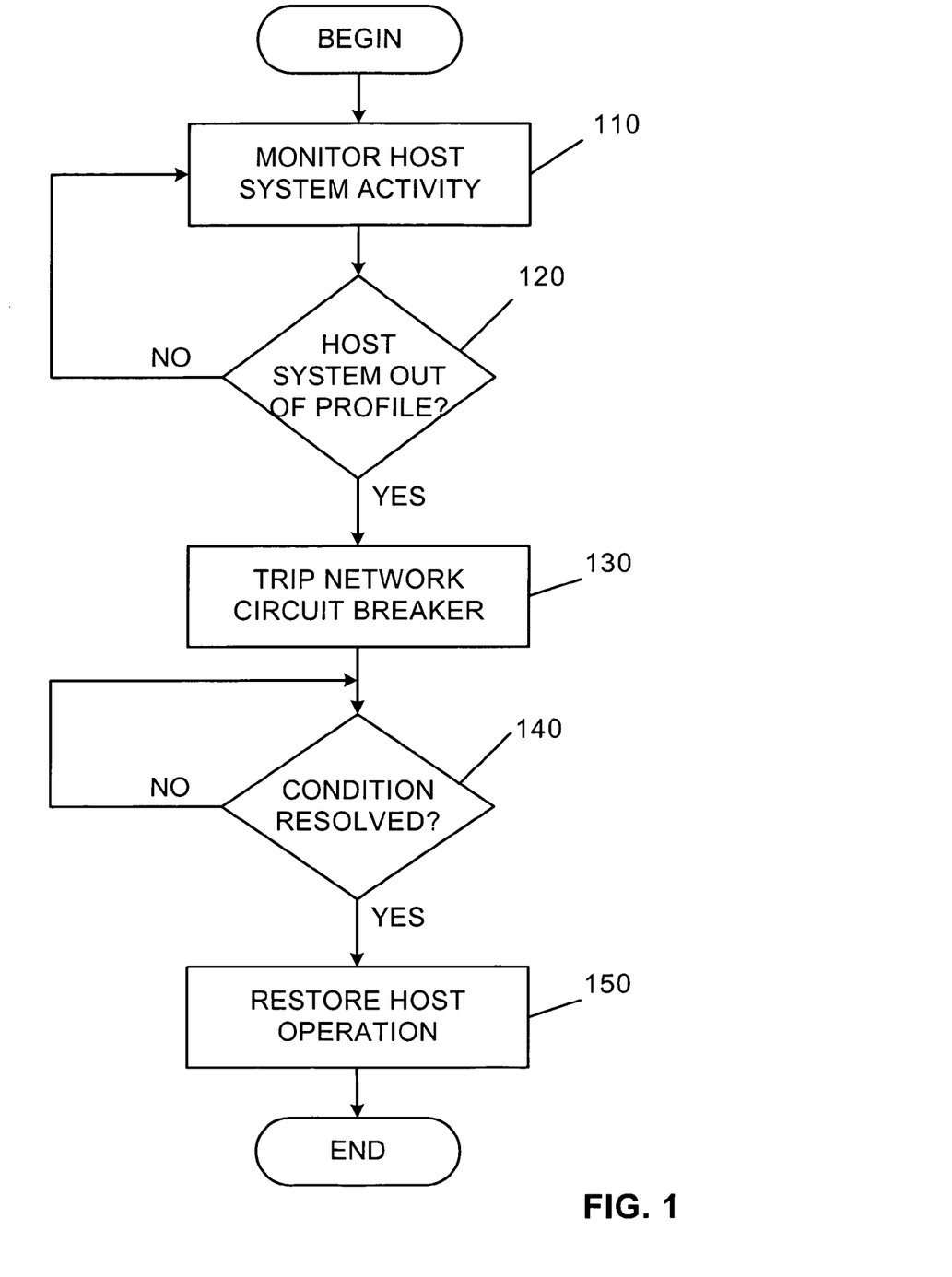
FIG. 1 is a flow diagram of one embodiment of a technique for tripping a network circuit breaker.

FIG. 1 is a flow diagram of one embodiment of a technique for tripping a network circuit breaker. The host system activity may be monitored, 110. Any type of host system activity may be monitored, for example, data may be scanned for virus/worm/Trojan horse signatures or profiles and/or traffic to and from the host system may be monitored.

In one embodiment, an autonomous hardware and/or software agent may continuously monitor the behavior of the host system and network traffic to determine whether the operation is within the normal operating profile (also referred to as "in-profile" operation). To address the different characteristics of different host systems and the possibility of ever changing network attack, new algorithms (e.g., heuristic analysis algorithms) may be downloaded to the monitoring agent to determine what host system characteristics are in-profile and what host system characteristics are out-of-profile.

If the characteristics are determined to be out-of-profile, 120, a network circuit breaker may be tripped, 130. An out-of-profile determination may be the result of network traffic conditions, security evaluations, risk assessment and/or other factors. In one embodiment, to trip the network circuit breaker, the monitoring agent may locally execute a pre-specified instruction sequence that may result in one or more actions including, for example, resetting the host system, notifying network administration, dropping or throttling or redirecting network traffic, restoring the host system, disabling one or more network interfaces and/or disabling one or more devices coupled with a host system bus.

The following example illustrates only one of many applications of the network circuit breaker functionality. For a computer system coupled with a network, a normal outgoing traffic profile for the computer system network interface may specify a combination of parameters such as the amount of traffic (e.g., how much traffic is expected to be sent over different time intervals) and the kind of traffic by category (e.g., SQL traffic vs. software revision control check-ins vs. HTTP transactions, etc.) or by destination network, etc. As an example, one parameter that may be monitored is connections per second. In one embodiment, a connection may be defined as an attempt to communicate with a new destination machine and/or application on destination machine. A large number of connection attempt may be indicative of a worm attempting to spread. Other example parameters may include, for example, receipt of network errors, such as IP ICMP errors including host not reachable errors. An egress traffic-monitoring agent embedded in a LAN controller (or some other part of the system) may track the outgoing traffic.

When the outgoing traffic shows a pre-selected level of deviation from the normal profile as determined by the downloaded heuristics or other parameters, the agent may invoke a pre-defined circuit breaker response that temporarily isolates the computer from the network. This can be achieved, for example, by preventing the traffic to go out but by still maintaining the network connectivity for out-of-band communication with the external management agents. The agent may also notify a network management entity of the situation.

Moreover, the network circuit breaker functionality may provide a circuit breaker response based on introspective rules for the host system. In this case, when connecting to a known network, the circuit breaker component may probe the host system's software and firmware responsible for the security of the host system, such as virus scanning and firewall features. If these components are disabled, uninstalled or otherwise modified from their expected state, then the network circuit breaker would take action by isolating the machine from the network until the machine can be restored to an acceptable state using the out-of-band channel to the embedded processor or other mechanism.

In one embodiment, the circuit breaker may remain in the tripped condition until the condition causing the circuit breaker to trip has been resolved, 140. When the condition has been resolved the host system may be restored to the operating condition that existed prior to tripping of the circuit breaker, 150.

In one embodiment, the components that provide the network circuit breaker functionality may also provide historical connectivity information to determine the boot history and network connection history of a machine. When a system is first authenticated to the network, the circuit breaker component(s) can examine its history since the last secure connection to the network. If untrusted networks were contacted or questionable peripherals were installed, the circuit breaker component(s) can isolate the system from the network until its proper configuration can be validated or restored by the out-of-band network connection to the circuit breaker component.

Figure 2:
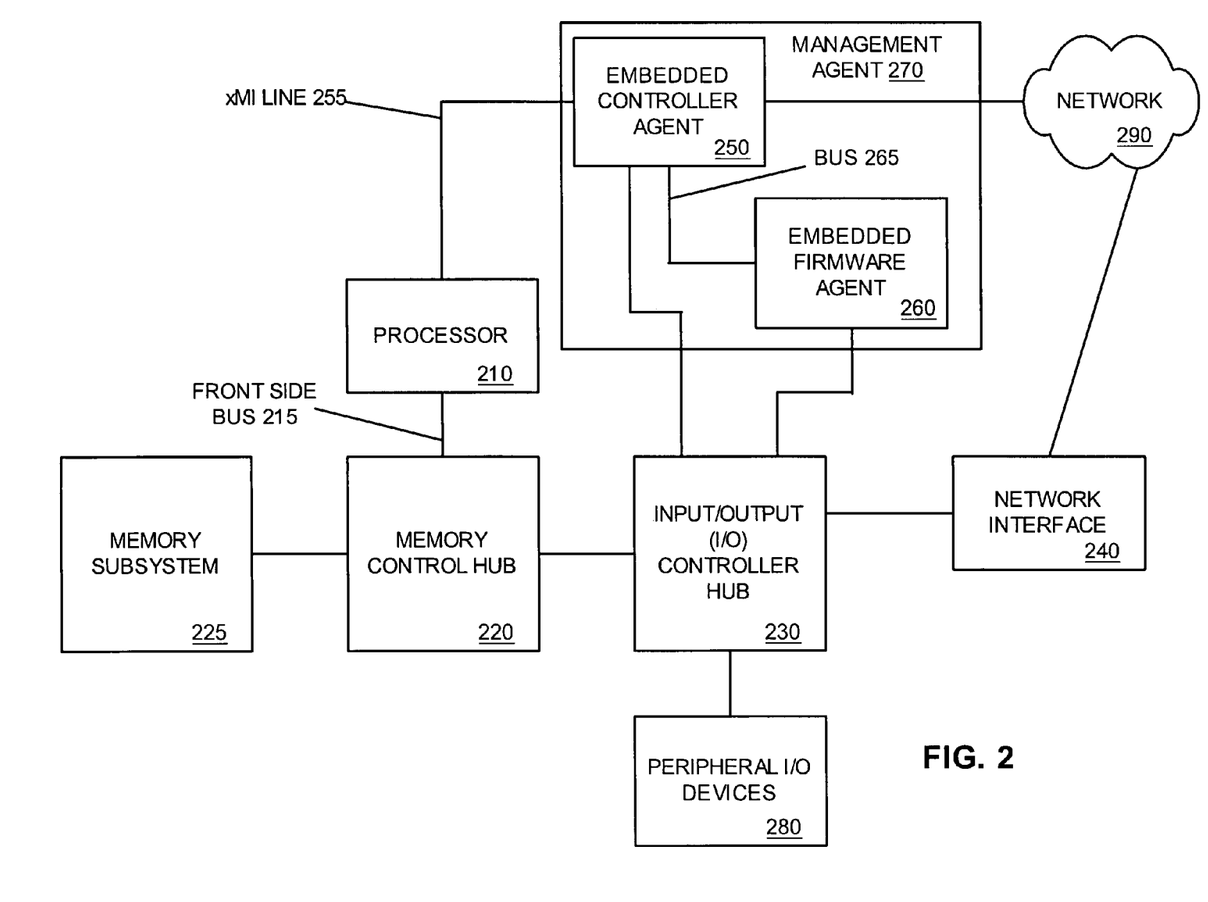
FIG. 2 is a block diagram of one embodiment of an electronic system that may be enabled with network circuit breaker functionality.

FIG. 2 is a block diagram of one embodiment of an electronic system that may be enabled with network circuit breaker functionality. The block diagram of FIG. 2 is intended to represent a broad category of electronic systems having network interfaces. The electronic system can be, for example, a desktop computer system, a mobile computer system, a server, a personal digital assistant (PDA), a cellular telephone, a set-top box, game console, satellite receiver, etc.

In one embodiment, processor 210 may be coupled to memory control hub 220 by front side bus 215. While the electronic system of FIG. 2 is described as having a single processor, multiple processor embodiments can also be supported. In an alternate embodiment, processor 210 may be coupled with memory control hub 220 by a shared system bus. Processor 210 can be any type of processor known in the art, for example, a processor from the Pentium® family of processors, the Itanium® family of processors, the Xeon® family of processors, available from Intel Corporation of Santa Clara, Calif. Other processors can also be used.

Memory control hub (MCH) 220 may provide an interface to memory subsystem 225 that can include any type of memory to be used with the electronic system. MCH 220 may also be coupled with input/output (I/O) controller hub (ICH) 230. In one embodiment, ICH 230 may provide an interface between the system and peripheral I/O devices 280 as well as between the system and network interface 240, which will provide an interface to external network 290. Network 290 may be any type of network, whether wired or wireless, for example, a local area network or a wide area network.

Embedded controller agent 250 may be coupled with ICH 230 and with network 290. The connection between embedded controller agent 250 and network 290 is a logical connection and may be implemented through a network interface within embedded controller agent 250 or by sharing a network connection through network interface 240 in which management traffic is routed to embedded controller agent 250.

The network connection for embedded controller agent 250 may be independent of the operation of the system and is independent of an operating system executed by processor 210. In one embodiment, all management traffic to and from embedded controller agent 250 may be communicated even in the absence of an operating system. In one embodiment, embedded controller agent 250 may host a network management stack to support the out-of band communications. In one embodiment, embedded controller agent 250 may include a microcontroller or other type of processing circuitry, memory and/or interface logic. One embodiment of embedded controller agent 250 is described in greater detail below.

In one embodiment, embedded controller agent 250 may be coupled with processor 210 via an interrupt interface with, for example, the SMI pin of a Pentium® processor or with the PMI pin of an Itanium® processor (generically, xMI line 255). Other system interrupt signals may be used for other processors. In one embodiment, embedded controller agent 250 may be connected to MCH 220 through which the interrupt signal may be asserted. Alternatively, embedded controller agent 250 may be a part of the MCH 220 or embedded controller agent may be part of ICH 230. As another alternative, embedded controller agent 250 may be coupled with ICH 230 or embedded controller agent 250 may be part of network interface 240 or any IO device.

In one embodiment, ICH 230 may also be coupled with embedded firmware agent 260. In an alternate embodiment, firmware to be accessed by embedded controller agent 250 may be within embedded controller agent 250 or another system component. In one embodiment, embedded firmware agent 260 may be a mechanism that enables executable content in the form of one or more software drivers to be loaded into the System Management Mode (SMM) of an Intel 32-bit family of microprocessor (i.e., IA-32 processors), or the native mode of an Itanium-based processor with PMI signal activation. The state of execution of code in IA32 SMM is initiated by an SMI signal and that in Itanium™ processors is initiated by PMI signal activation; for simplicity, these will generally be referred to as SMM. In one embodiment, embedded controller agent 250 and/or embedded firmware agent 260 operate as described herein by selectively invoking SMM. In another embodiment, embedded controller agent 250 and/or embedded firmware agent 260 operate as described herein without the use of SMM.

In one embodiment, embedded controller agent 250 may be coupled with embedded firmware agent 260 via bi-directional agent bus 265. By communicating over bi-directional agent bus 265, embedded controller agent 250 and embedded firmware agent 260 may be configured to provide manageability and/or security functionality. Embedded controller agent 250 and embedded firmware agent 260 may be components of a single integrated circuit as management agent 270.

As described in greater detail below, embedded controller agent 250, embedded firmware agent 260, ICH 230 and/or network interface 240 may interact to allow the electronic device of FIG. 2 to be self-isolating from network 290. In one embodiment, embedded controller agent 250 and embedded firmware agent 260 operate to monitor the host electronic system to determine whether the electronic system should be isolated. Embedded firmware agent 260 and ICH 230 operate to prevent communications with network 260, for example, by disabling network interface 240. In an alternate embodiment, network circuit breaker functionality may be provided with components other than embedded controller agent 250 and embedded firmware agent 260.

In one embodiment, the connection between embedded controller agent 250 and network 290 is maintained for management, diagnostic and/or remediation purposes when the electronic system is otherwise isolated from network 290. That is, the electronic system under operating system control is isolated from network 290, while an out-of-band network connection that is independent of the operating system is maintained.

Example Mechanisms for Self-Isolation and/or Self-Healing

Network worms and virus attacks have become a recurring threat in networked computing environments. For enterprise networks, such attacks can present a significant risk in terms of interference with business operations and possibly of intellectual property. Described herein are techniques for isolating an infected, networked device from the rest of the network.

In one embodiment, remote access can be allowed to trusted devices via an out-of-band network connection that operates independently of the networked device operating system. In one embodiment, the system component that acts as the platform "circuit breaker" is positioned to isolate the networked device from the network. In one embodiment, this circuit breaker component is capable of identifying if the system has been infected. Multiple techniques and components for providing network device isolation as well as isolation of other system bus devices are described in the above-referenced, co-pending U.S. Patent application.

One technique for triggering the network circuit breaker includes, for example, triggering a self-isolation in response to absence of periodic authenticated messages from the host operating system, host resident firewall application and/or other host resident security components. Failure to receive the periodic messages from the monitored components may be the result of the component being disabled or tampered with or alerts from these monitored components indicating lack of appropriate security patches or improper configurations, positive results from a virus or memory scan can cause the device to be isolated until the trigger condition is resolved.

In one embodiment, security policies may be configured remotely by an administrator or other entity. The configuration may be provided via the out-of-band management communications. In addition to the events or conditions that trigger the network circuit breaker, other responses can be triggered based on the security policies. For example, if a virus causes files on a disk drive to be deleted or the drive to be formatted, the drive may be disabled using the techniques described herein to prevent damage from a virus or from other malicious intent. Thus, the circuit breaker functionality may be applied to any device coupled with the bus and is not limited to network communications.

Figure 3:
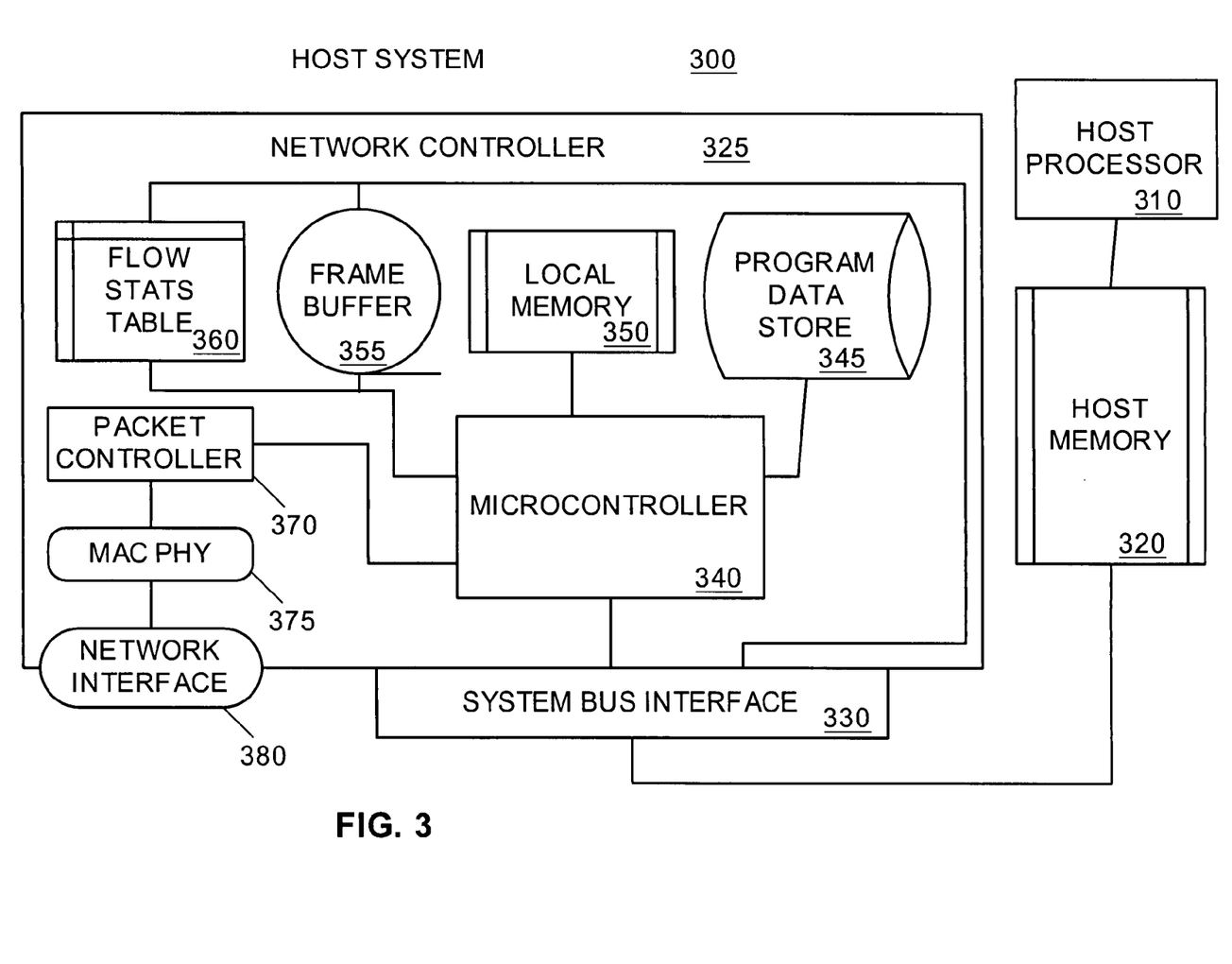
FIG. 3 is a block diagram of one embodiment of components that may provide network circuit breaker functionality.

FIG. 3 is a block diagram of one embodiment of components that may provide network circuit breaker functionality. In one embodiment, the circuit breaker functionality is controlled by a microcontroller embedded within a network control device (e.g., part of a network interface card). The embedded controller may have access to dynamic memory and persistent storage that is independent from and/or isolated from the host platform. The embedded controller may also have independent network connectivity through the network control device. In one embodiment, the network stack for out-of-band connectivity provides secure protocols such as IPSec, TLS/SSL for communicating securely with a remote administrator. IPSec is described in Internet Engineering Task Force (IETF) Request for Comments (RFC) 2401 entitled "Security Architecture for Internet Protocol," (published November 1998) as well as related documents. The TLS Protocol is described in IETF RFC 2246, version 1 entitled "The TLS Protocol," (published January 1999) as well as related documents. The SSL Protocol is described in "The SSL Protocol, Version 3.0" (published November 1996 by IETF) as well as related documents.

The microcontroller may have access to a flow statistics table and a frame buffer hosted by the network controller to monitor network traffic as well as the ability to enter packet filters and corresponding actions into the network control packet classifier. The controller may also have access to the host's dynamic memory for the purpose of performing risk assessment of the host platform by examining specific software components stored in the memory.

In the example of FIG. 3, microcontroller 340 may be embedded within network controller 325 and may control the network circuit breaker functionality. Microcontroller 340 may have access to host memory 320 through system bus interface 330. Access to host memory 320 may allow microcontroller 340 to scan memory 320 or for microcontroller 340 to have access to results of scans of memory 320 performed, for example, by host processor 310.

Microcontroller 340 may be coupled with program data store 345 that may store instructions to be executed by microcontroller 340 to perform network circuit breaker functionality including, for example, isolation of host system 300 from a network (not shown in FIG. 3). In one embodiment, program data store 345 and/or microcontroller 340 support download of additional/updated heuristics and/or algorithms for security analysis from remote devices via the network. Program data store may be any type of persistent memory, for example, flash memory that may store instructions to be executed by microcontroller 340. Microcontroller 340 may also be coupled with local memory 350 that may be used to store data or for purposes associated with execution of instructions from program data store 345.

Microcontroller 340 may further be coupled with frame buffer 355 and flow statistics table 360. In one embodiment, microcontroller 340 may use frame buffer 355 and/or flow statistics table 360 to monitor network traffic to or from host system 300. By monitoring network traffic, microcontroller 340 may determine whether the network traffic is in-profile or out-of-profile.

In one embodiment, microcontroller 340 may also be coupled with packet classifier 370 to add filters to monitor for known virus/worm/Trojan horse patterns or signatures. In one embodiment, circuit breaker actions may be applied based on specific subsets of network traffic as identified by source and/or destination address, application source or destination port, protocol, VLAN ID, MPLS tag, TCP flags, ICMP types, or any other information that is found in packet headers. Packet classifier 370 may be coupled with media access control (MAC) physical (PHY) 375 components that send and receive network traffic via network interface 380. Any type of MAC PHY components and network interfaces known in the art may be used.

In one embodiment, if microcontroller 340 detects an out-of-profile condition, actions defined by administrator-configurable responses may be taken. The administrator-configurable responses may be stored in program data store 345 and/or local memory 350 and may include many types of responsive actions. For example, microcontroller 340 can cause network interface 380 and/or any other network interfaces to be disabled or throttled or redirected, or microcontroller 340 can cause one or more bus devices to be disabled. In one embodiment, PCI-compliant bus devices may be disabled by using a configuration operation to write a specific value to a corresponding PCI Command register, which is described in greater detail below.

As another example, microcontroller 340 may cause notifications to be sent to one or more remote devices and/or parties. For example, microcontroller 340 can cause a secure fault message to be sent to a designated administration terminal. In one embodiment, when network communications are disabled, management traffic is allowed by network controller 325 that may, for example, allow microcontroller 340 to engage in repair or restoration actions.

Figure 4:
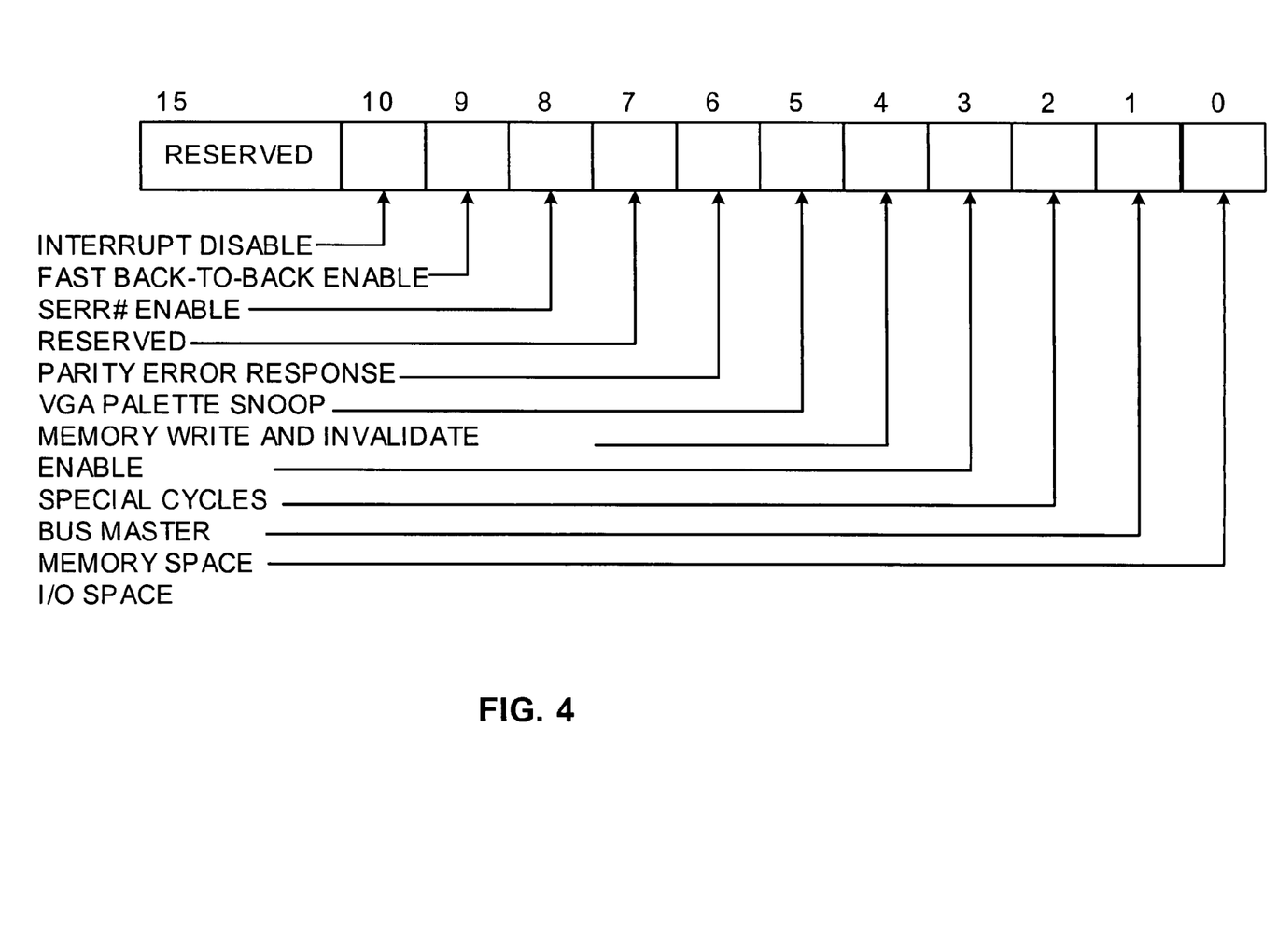
FIG. 4 is an illustration of a PCI Command register.

FIG. 4 is an illustration of a PCI Command register. The labels for the various bits of the register in FIG. 4 are specific to the PCI standards. In one embodiment, values are written to the PCI Command register using configuration cycles as defined in the PCI standards. The PCI Local Bus Specification, Revision 2.3 published Mar. 29, 2002 as well as the PCI Express Base Specification, Version 1.0 published Jul. 23, 2002 and Version 1.0a published Oct. 7, 2003 define the PCI Command register of devices conforming to these specifications. Subsequent and related standards may also define a Command register or equivalent that can be used as described herein. Subsequent and related PCI standards include, for example, PCI-Express, PCI-X, PCI-AS (Advanced Switching). The description herein generically refers to all PCI standards mentioned or developed in the future that include a Command register or comparable functionality.

When a value of 0x00 is written to a PCI Command register, the corresponding PCI device is logically disabled from the PCI bus for all accesses except configuration accesses. This effectively disables the device. All devices conforming to the PCI bus standards will support this level of functionality. In non PCI-compliant embodiments, other techniques can be used to disable a network interface in a similar manner.

In one embodiment, a USB hub coupled with a PCI-compliant bus may be disabled using the techniques described. When the USB hub has been disabled, all USB-compliant devices coupled with the hub are disabled. Thus, if a network interface is USB-compliant, the network interface can be disabled by writing a value to a PCI Command register.

Figure 5A:
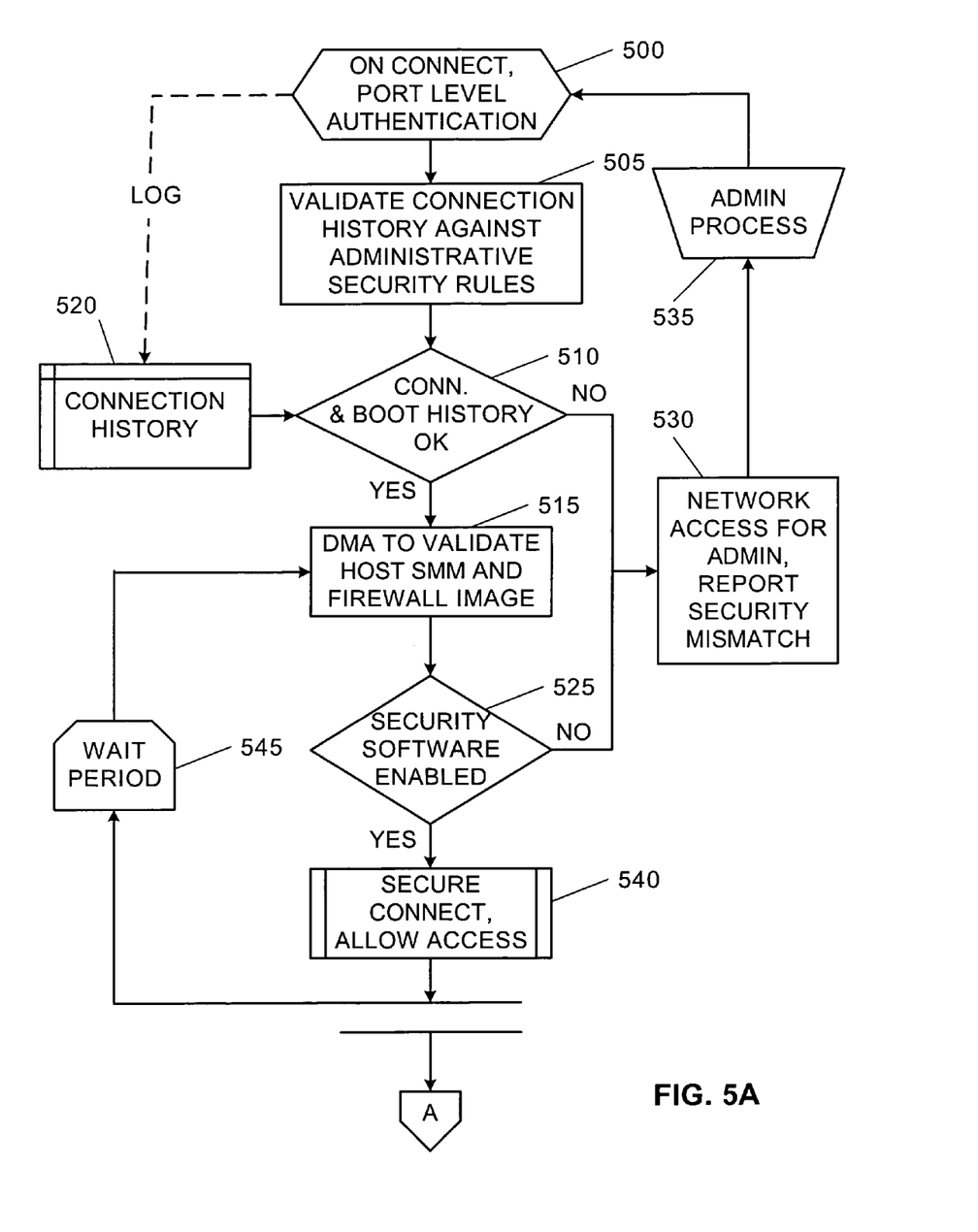
FIGS. 5A and 5B illustrate a flow diagram of one embodiment of operation of a network circuit breaker.
Figure 5B:
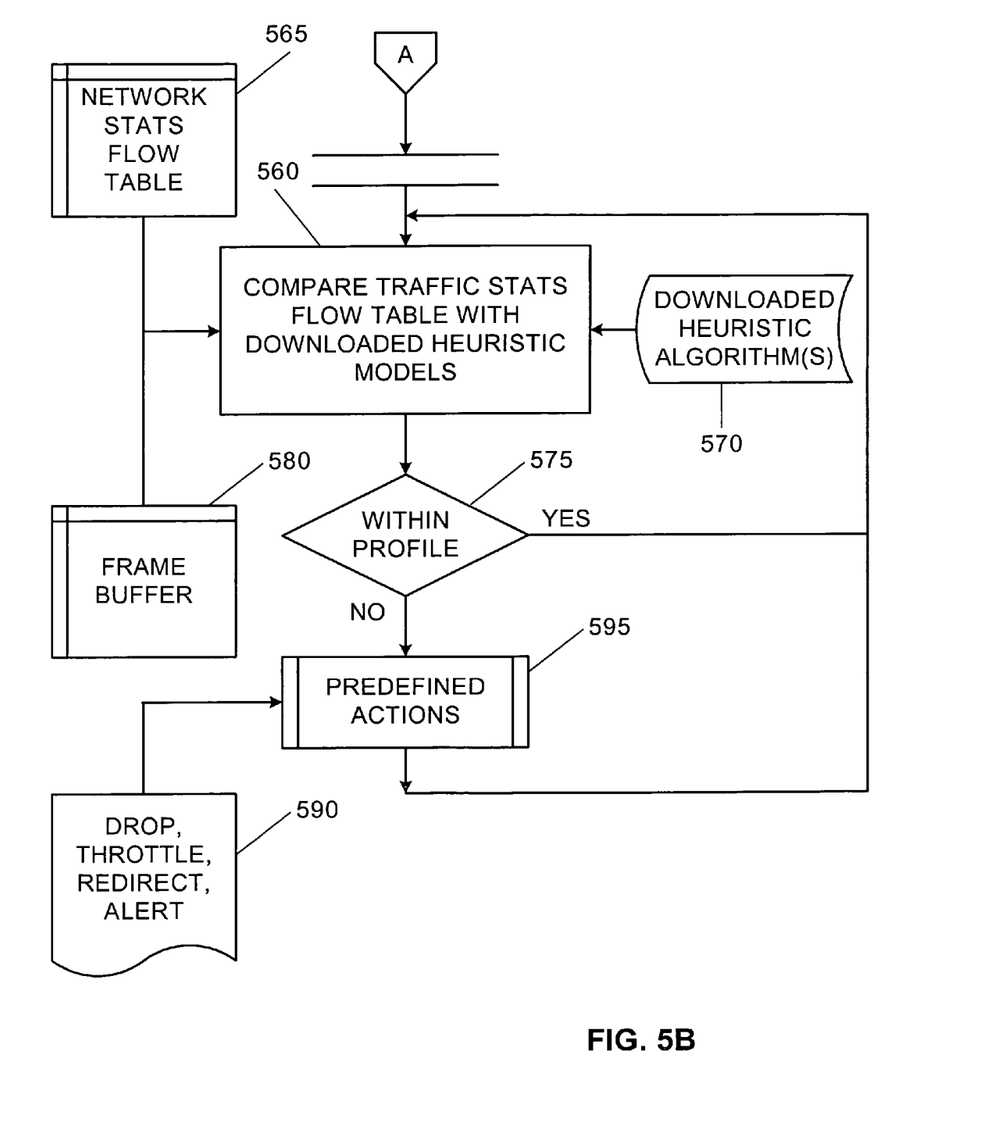

FIGS. 5A and 5B illustrate a flow diagram of one embodiment of operation of a network circuit breaker. In one embodiment, upon connecting to a network, the circuit breaker (e.g., the microcontroller and other components described with respect to FIG. 3), may authenticate the network connection, 500. In one embodiment, a port-level authentication is performed. In alternate embodiments, other authentication techniques may be used.

In one embodiment, if the network connection is unknown to the circuit breaker, the circuit breaker may only allow connections defined by rules provided by an administrator for access to remote networks. That is, if a computer (or other electronic system) is coupled with a network that is not on an approved list or does not meet predetermined approved network criteria; the circuit breaker may allow only a limited set of possible actions to a user of the computer, 530. In one embodiment, a boot and/or connection history may be logged, 520, and may be used for validation purposes to determine if the machine had booted from an unauthorized media in which case the appropriate circuit breaker actions may be applied as defined by administrative security policy.

In one embodiment, if the system is coupled with a known network, the circuit breaker may examine the boot and/or connection history to determine what actions may be taken if the system was booted in a vulnerable state or exposed to an insecure network, 505. In one embodiment, the circuit breaker may use direct memory access (DMA) or other device to validate the host's system management mode (SMM) firmware, BIOS and/or a system firewall, OS or other OS resident software, 515.

If any of the validation procedures fails, the circuit breaker may allow only the limited set of actions including restrictions on connectivity, 530. Similarly, if the system security software is not enabled, 525, the circuit breaker may allow only the limited set of actions, 530. The limited set of actions may include, for example, the ability to read data from a server, but not the ability to download or otherwise store data from the server. In one embodiment, the limited set of actions includes isolating the system from the network except for out-of-band management communications. For example, storage media that the user or applications may access may be restricted outgoing communications may be restricted, communications to a patch server may be restricted such that the user can only access the network to download the latest security patches to bring the machine up to the acceptable security conformance levels, or the system may be redirected to a remediation network, where only the facilities hosted by the remediation network are accessible.

If the circuit breaker determines that the system is secure and connected to a secure network, the system may be granted the ability for unlimited, or a less limited set of actions, 540. In one embodiment, after a waiting period, 545, the validation procedures may be repeated. In one embodiment, if security software is not installed or not enabled, 525, the circuit breaker may report the error and/or correct the error condition.

In one embodiment, when the circuit breaker may also monitor network activity and compare the monitored traffic statistics from network flow statistics table 565 and frame buffer 580, against downloadable heuristic models, 570. If the traffic activity is within profile, 575, the circuit breaker continues to monitor network traffic. If the traffic activity is not within profile, 575, the circuit breaker takes predetermined actions against out-of-profile traffic. The actions may include, for example, dropping a network connection, throttling a network connection, redirecting network traffic and/or alerting a network administrator, 590.

CONCLUSION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
monitoring a host electronic system with a monitoring component of the host electronic system to determine whether a network connection for the host electronic system is operating within a predefined operating profile that includes at least network packet transmission parameters, wherein the monitoring component comprises an embedded agent;
generating an indication of out-of-profile operation when the network connection for the host electronic system is not operating within the predefined operating profile;
taking action on one or more components within the host electronic system in response to the indication of out-of-profile operation by isolating the one or more components from a network to which the host electronic system is coupled while maintaining an out-of-band communication channel for the host electronic system, wherein the out-of-band communication channel is maintained by the embedded agent that operates independently of a host operating system executing on the host electronic system and is used for management purposes to allow one or more components not isolated from the network to restore or repair a condition causing the out-of-profile operation, wherein the embedded agent is coupled to an embedded firmware agent via a bi-directional agent bus, and the embedded agent and embedded firmware agent operate together to provide manageability and/or security functionality;
examining, as part of a network authentication process when the host system is first authenticated to the network, a connection history of the host electronic system to determine a boot history and network connection history of the host system since a previous secure connection, wherein the connection history comprises at least an amount of traffic, a kind of traffic by category and a destination network; and
isolating the host electronic system if untrusted networks were contacted or untrusted peripherals were installed until an approved configuration can be validated or restored via the out-of-band network connection.

2. The method of claim 1 wherein monitoring the host electronic system to determine whether the host electronic system is operating within the predefined operating profile comprises monitoring network traffic from the host electronic system to determine whether a quantity of network traffic is within a network traffic quantity profile as defined by the operating profile.

3. The method of claim 1 wherein monitoring the host electronic system to determine whether the host electronic system is operating within the predefined operating profile comprises monitoring network traffic from the host electronic system to determine whether a quantity of network traffic in a plurality of network traffic categories is within a network traffic quantity and traffic category profile as defined by the operating profile.

4. The method of claim 1 wherein monitoring the host electronic system to determine whether the host electronic system is operating within the predefined operating profile comprises monitoring network traffic from the host electronic system to determine whether one or more destinations of network traffic are within a network traffic destination profile as defined by the operating profile.

5. The method of claim 1 wherein taking action on the one or more components within the host electronic system in response to the indication of out-of-profile operation comprises disabling a network interface in response to the indication of out-of-profile operation.

6. The method of claim 5 wherein disabling the network interface comprises logically disabling the network interface by writing a pre-selected value to a control register corresponding to the network interface to be logically disabled using a configuration operation.

7. The method of claim 6 wherein writing a pre-selected value to a control register corresponding to the network interface to be logically disabled using a configuration operation comprises writing the pre-selected value to a Peripheral Component Interconnect (PCI) Command register corresponding to the network interface.

8. The method of claim 1 wherein taking action on the one or more components within the host electronic system in response to the indication of out-of-profile operation comprises disabling a device coupled with a host system bus in response to the indication of out-of-profile operation.

9. The method of claim 8 wherein disabling the device coupled with the host system bus comprises logically disabling the device by writing a pre-selected value to a control register corresponding to the device to be logically disabled using a configuration operation.

10. The method of claim 9 wherein writing a pre-selected value to a control register corresponding to the device to be logically disabled using a configuration operation comprises writing the pre-selected value to a Peripheral Component Interconnect (PCI) Command register corresponding to the device.

11. The method of claim 1 wherein taking action on the one or more components within the host electronic system in response to the indication of out-of-profile operation comprises throttling network traffic.

12. The method of claim 1 wherein taking action on the one or more components within the host electronic system in response to the indication of out-of-profile operation comprises redirecting network traffic.

13. The method of claim 1 wherein taking action on the one or more components within the host electronic system in response to the indication of out-of-profile operation comprises sending an alert corresponding to the indication to a network administration device.

14. The method of claim 1 wherein the host electronic system comprises a computer system.

15. The method of claim 1 wherein the host electronic system comprises a network router.

16. The method of claim 1 wherein monitoring the host electronic system to determine whether the host electronic system is operating within the predefined operating profile comprises searching files of the host electronic system for predetermined indications corresponding to one or more predefined risk parameters.

17. The method of claim 1 further comprising:
receiving an updated operating profile from a remote device;
monitoring the host electronic system to determine whether the host electronic system is operating within the updated operating profile; and
generating the indication of out-of-profile operation when the host electronic system is not operating within the updated operating profile.

18. The method of claim 17 wherein receiving the updated operating profile from the remote device comprises receiving programming instructions from the remote device.

19. The method of claim 17 wherein receiving the updated operating profile from the remote device comprises receiving configuration data from the remote device.

20. The method of claim 1 wherein monitoring the host electronic system to determine whether the host electronic system is operating within the predefined operating profile comprises scanning a dynamic memory of the host electronic system to determine the presence and integrity of pre-selected security software components.

21. The method of claim 1 wherein monitoring the host electronic system to determine whether the host electronic system is operating within the predefined operating profile comprises determining whether the host electronic system is coupled with a network that complies with the predefined operating profile.

22. The method of claim 1 wherein monitoring the host electronic system to determine whether the host electronic system is operating within the predefined operating profile comprises determining whether the host electronic system has been booted from unauthorized media.

23. The method of claim 1 wherein monitoring the host electronic system to determine whether the host electronic system is operating within the predefined operating profile comprises determining whether a Basic Input/Output System (BIOS) of the host electronic system complies with the predefined operating profile.

24. An article comprising a non-transitory computer-readable medium having stored thereon instructions that, when executed, cause one or more processors to:
monitor a host electronic system with a monitoring component of the host electronic system to determine whether a network connection for the host electronic system is operating within a predefined operating profile that includes at least network packet transmission parameters, wherein the monitoring component comprises an embedded agent;
generate an indication of out-of-profile operation when the network connection for the host electronic system is not operating within the predefined operating profile;
take action on one or more components within the host electronic system in response to the indication of out-of-profile operation by isolating the one or more components from a network to which the host electronic system is coupled while maintaining an out-of-band communication channel for the host electronic system, wherein the out-of-band communication channel is maintained by the embedded agent that operates independently of a host operating system executing on the host electronic system and is used for management purposes to allow one or more components not isolated from the network to restore or repair a condition causing the out-of-profile operation, wherein the embedded agent is coupled an to embedded firmware agent via a bi-directional agent bus, and the embedded agent and embedded firmware agent operate together to provide manageability and/or security functionality;
examine, as part of a network authentication process when the host system is first authenticated to the network, a connection history of the host electronic system to determine a boot history and network connection history of the host system since a previous secure connection, wherein the connection history comprises at least an amount of traffic, a kind of traffic by category and a destination network; and
isolate the host electronic system if untrusted networks were contacted or untrusted peripherals were installed until an approved configuration can be validated or restored via the out-of-band network connection.

25. The article of claim 24 wherein the instructions that cause the one or more processors to monitor the host electronic system to determine whether the host electronic system is operating within the predefined operating profile comprise instructions that, when executed, cause the one or more processors to monitor network traffic from the host electronic system to determine whether a quantity of network traffic is within a network traffic quantity profile as defined by the operating profile.

26. The article of claim 24 wherein the instructions that cause the one or more processors to monitor the host electronic system to determine whether the host electronic system is operating within the predefined operating profile comprise instructions that, when executed, cause the one or more processors to monitor network traffic from the host electronic system to determine whether a quantity of network traffic in a plurality of network traffic categories is within a network traffic quantity and traffic category profile as defined by the operating profile.

27. The article of claim 24 wherein the instructions that cause the one or more processors to monitor the host electronic system to determine whether the host electronic system is operating within the predefined operating profile comprise instructions that when executed, cause the one or more processors to monitor network traffic from the host electronic system to determine whether one or more destinations of network traffic are within a network traffic destination profile as defined by the operating profile.

28. The article of claim 24 wherein the instructions that cause the one or more processors to disable one or more components within the host electronic system in response to the indication of out-of-profile operation comprise instructions that, when executed, cause the one or more processors to disable a network interface in response to the indication of out-of-profile operation.

29. The article of claim 28 wherein the instructions that cause the one or more processors to disable the network interface comprise instructions that, when executed, cause the one or more processors to logically disable the network interface by writing a pre-selected value to a control register corresponding to the network interface to be logically disabled using a configuration operation.

30. The article of claim 29 wherein the instructions that cause the one or more processors to write a pre-selected value to a control register corresponding to the network interface to be logically disabled using a configuration operation comprise instructions that, when executed, cause the one or more processors to write the pre-selected value to a Peripheral Component Interconnect (PCI) Command register corresponding to the network interface.

31. The article of claim 24 wherein the instructions that cause the one or more processors to disable one or more components within the host electronic system in response to the indication of out-of-profile operation comprise instructions that, when executed, cause the one or more processors to disable a device coupled with a host system bus in response to the indication of out-of-profile operation.

32. The article of claim 31 wherein the instructions that cause the one or more processors to disable the device coupled with the host system bus comprise instructions that, when executed, cause the one or more processors to logically disable the device by writing a pre-selected value to a control register corresponding to the device to be logically disabled using a configuration operation.

33. The article of claim 32 wherein the instructions that cause the one or more processors to write a pre-selected value to a control register corresponding to the device to be logically disabled using a configuration operation comprise instructions that, when executed, cause the one or more processors to write the pre-selected value to a Peripheral Component Interconnect (PCI) Command register corresponding to the device.

34. The article of claim 24 wherein the instructions that cause the one or more processors to take action on the one or more components within the host electronic system in response to the indication of out-of-profile operation comprise instructions that, when executed cause the one or more processors to throttle network traffic.

35. The article of claim 24 wherein the instructions that cause the one or more processors to take action on the one or more components within the host electronic system in response to the indication of out-of-profile operation comprise instructions that cause the one or more processors to redirect network traffic.

36. The article of claim 24 wherein the instructions that cause the one or more processors to take action on the one or more components within the host electronic system in response to the indication of out-of-profile operation comprise instructions that, when executed, cause the one or more processors to send an alert corresponding to the indication to a network administration device.

37. The article of claim 24 wherein the host electronic system comprises a computer system.

38. The article of claim 24 wherein the host electronic system comprises a network router.

39. The article of claim 24 wherein the instructions that cause the one or more processors to monitor the host electronic system to determine whether the host electronic system is operating within the predefined operating profile comprise instructions that, when executed, cause the one or more processors to search files of the host electronic system for predetermined indications corresponding to one or more predefined risk parameters.

40. The article of claim 24 further comprising instructions that, when executed, cause the one or more processors to:

receive an updated operating profile from a remote device;
monitor the host electronic system to determine whether the host electronic system is operating within the updated operating profile; and
generate the indication of out-of-profile operation when the host electronic system is not operating within the updated operating profile.

41. The article of claim 40 wherein the instructions that cause the one or more processors to receive the updated operating profile from the remote device comprise instructions that, when executed, cause the one or more processors to receive further instructions from the remote device.

42. The article of claim 40 wherein the instructions that cause the one or more processors to receive the updated operating profile from the remote device comprise instructions that, when executed, cause the one or more processors to receive configuration data from the remote device.

43. The article of claim 24 wherein the instructions that cause the one or more processors to monitor the host electronic system to determine whether the host electronic system is operating within the predefined operating profile comprise instructions that cause the one or more processors to scan a dynamic memory of the host electronic system to determine the presence and integrity of pre-selected security software components.

44. The article of claim 24 wherein the instructions that cause the one or more processors to monitor the host electronic system to determine whether the host electronic system is operating within the predefined operating profile comprise instructions that, when executed, cause the one or more processors to determine whether the host electronic system is coupled with a network that complies with the predefined operating profile.

45. The article of claim 24 wherein the instructions that cause the one or more processors to monitor the host electronic system to determine whether the host electronic system is operating within the predefined operating profile comprise instructions that, when executed, cause the one or more processors to determine whether the host electronic system has been booted from unauthorized media.

46. The article of claim 24 wherein the instructions that cause the one or more processors to monitor the host electronic system to determine whether the host electronic system is operating within the predefined operating profile comprise instructions that, when executed, cause the one or more processors to determine whether a Basic Input/Output System (BIOS) of the host electronic system complies with the predefined operating profile.

47. A system comprising:

dynamic random access memory (DRAM);
one or more processors coupled with the DRAM; and
a computer-readable medium having stored thereon instructions that, when executed, cause the one or more processors to monitor a host electronic system with a monitoring component of the host electronic system to determine whether a network connection for the host electronic system is operating within a predefined operating profile that includes at least network packet transmission parameters, wherein the monitoring component comprises an embedded agent, to generate an indication of out-of-profile operation when the network connection for the host electronic system is not operating within the predefined operating profile, to take action on one or more components within the host electronic system in response to the indication of out-of-profile operation by isolating the one or more components from a network to which the host electronic system is coupled while maintaining an out-of-band communication channel for the host electronic system, wherein the out-of-band communication channel is maintained by the embedded agent that operates independently of a host operating system executing on the host electronic system and is used for management purposes to allow one or more components not isolated from the network to restore or repair a condition causing the out-of-profile operation, wherein the embedded agent is coupled to an embedded firmware agent via a bi-directional agent bus, and the embedded agent and embedded firmware agent operate together to provide manageability and/or security functionality, to examine, as part of a network authentication process when the host system is first authenticated to the network, a connection history of the host electronic system to determine a boot history and network connection history of the host system since a previous secure connection, wherein the connection history comprises at least an amount of traffic, a kind of traffic by category and a destination network; and, and to isolate the host electronic system if untrusted networks were contacted or untrusted peripherals were installed until an approved configuration can be validated or restored via the out-of-band network connection.

48. The system of claim 47 wherein the instructions that cause the one or more processors to monitor the host electronic system to determine whether the host electronic system is operating within the predefined operating profile comprise instructions that, when executed, cause the one or more processors to monitor network traffic from the host electronic system to determine whether a quantity of network traffic is within a network traffic quantity profile as defined by the operating profile.

49. The system of claim 47 wherein the instructions that cause the one or more processors to monitor the host electronic system to determine whether the host electronic system is operating within the predefined operating profile comprise instructions that, when executed, cause the one or more processors to monitor network traffic from the host electronic system to determine whether a quantity of network traffic in a plurality of network traffic categories is within a network traffic quantity and traffic category profile as defined by the operating profile.

50. The system of claim 47 wherein the instructions that cause the one or more processors to monitor the host electronic system to determine whether the host electronic system is operating within the predefined operating profile comprise instructions that when executed, cause the one or more processors to monitor network traffic from the host electronic system to determine whether one or more destinations of network traffic are within a network traffic destination profile as defined by the operating profile.

51. The system of claim 47 wherein the instructions that cause the one or more processors to disable one or more components within the host electronic system in response to the indication of out-of-profile operation comprise instructions that, when executed, cause the one or more processors to disable a network interface in response to the indication of out-of-profile operation.

52. The system of claim 47 wherein the instructions that cause the one or more processors to disable the network interface comprise instructions that, when executed, cause the one or more processors to logically disable the network interface by writing a pre-selected value to a control register corresponding to the network interface to be logically disabled using a configuration operation.

53. The system of claim 52 wherein the instructions that cause the one or more processors to write a pre-selected value to a control register corresponding to the network interface to be logically disabled using a configuration operation comprise instructions that, when executed, cause the one or more processors to write the pre-selected value to a Peripheral Component Interconnect (PCI) Command register corresponding to the network interface.

54. The system of claim 47 wherein the instructions that cause the one or more processors to disable one or more components within the host electronic system in response to the indication of out-of-profile operation comprise instructions that, when executed, cause the one or more processors to disable a device coupled with a host system bus in response to the indication of out-of-profile operation.

55. The system of claim 54 wherein the instructions that cause the one or more processors to disable the device coupled with the host system bus comprise instructions that, when executed, cause the one or more processors to logically disable the device by writing a pre-selected value to a control register corresponding to the device to be logically disabled using a configuration operation.

56. The system of claim 55 wherein the instructions that cause the one or more processors to write a pre-selected value to a control register corresponding to the device to be logically disabled using a configuration operation comprise instructions that, when executed, cause the one or more processors to write the pre-selected value to a Peripheral Component Interconnect (PCI) Command register corresponding to the device.

57. The system of claim 47 wherein the instructions that cause the one or more processors to monitor the host electronic system to determine whether the host electronic system is operating within the predefined operating profile comprise instructions that, when executed, cause the one or more processors to search files of the host electronic system for predetermined indications corresponding to one or more predefined risk parameters.

58. The system of claim 47, wherein the computer-readable medium further comprising instructions that, when executed, cause the one or more processors to receive an updated operating profile from a remote device, monitor the host electronic system to determine whether the host electronic system is operating within the updated operating profile, and generate the indication of out-of-profile operation when the host electronic system is not operating within the updated operating profile.

* * * * *